Dec. 27, 1938.  B. STECHBART ET AL  2,141,960
MOTION PICTURE CAMERA AND THE LIKE
Filed Feb. 2, 1934    5 Sheets-Sheet 1
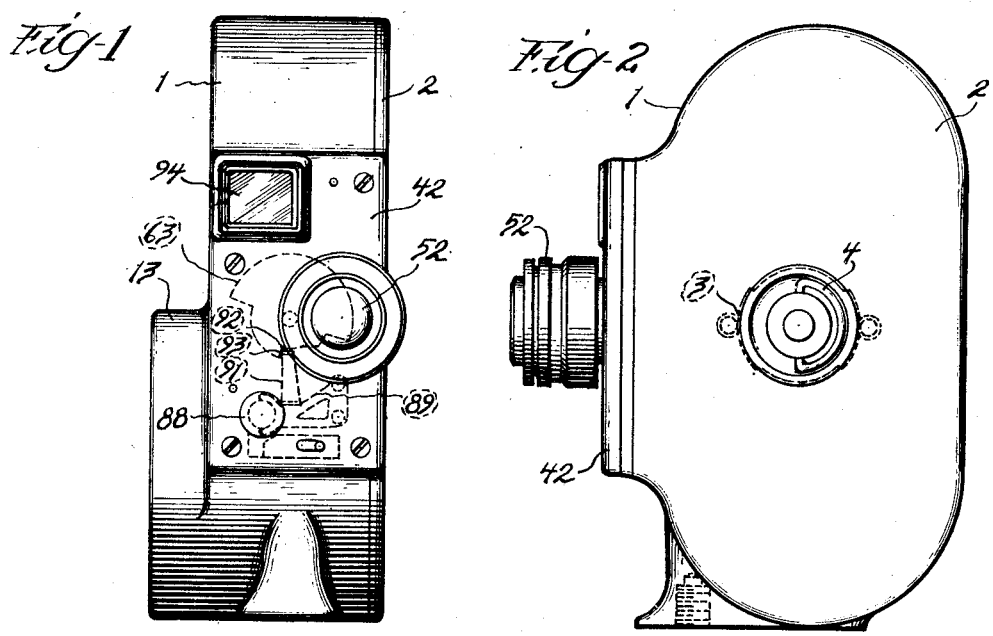
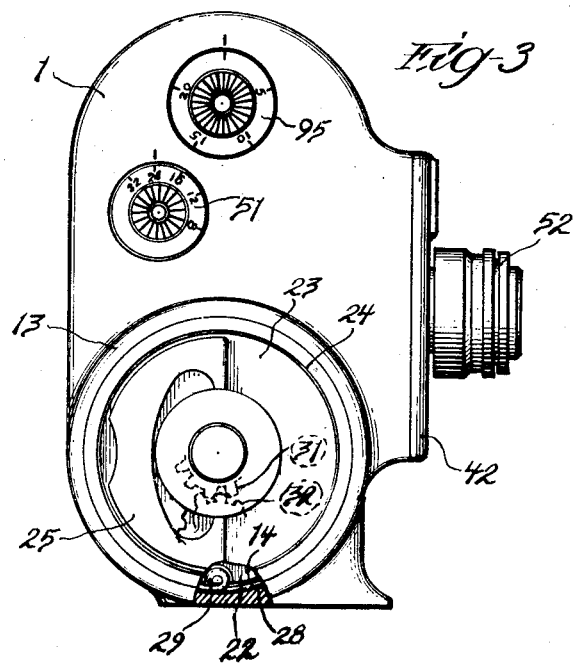
Inventors.
Bruno Stechbart
George A. Brueske Dec. 27, 1938.   B. STECHBART ET AL   2,141,960
MOTION PICTURE CAMERA AND THE LIKE
Filed Feb. 2, 1934   5 Sheets-Sheet 2
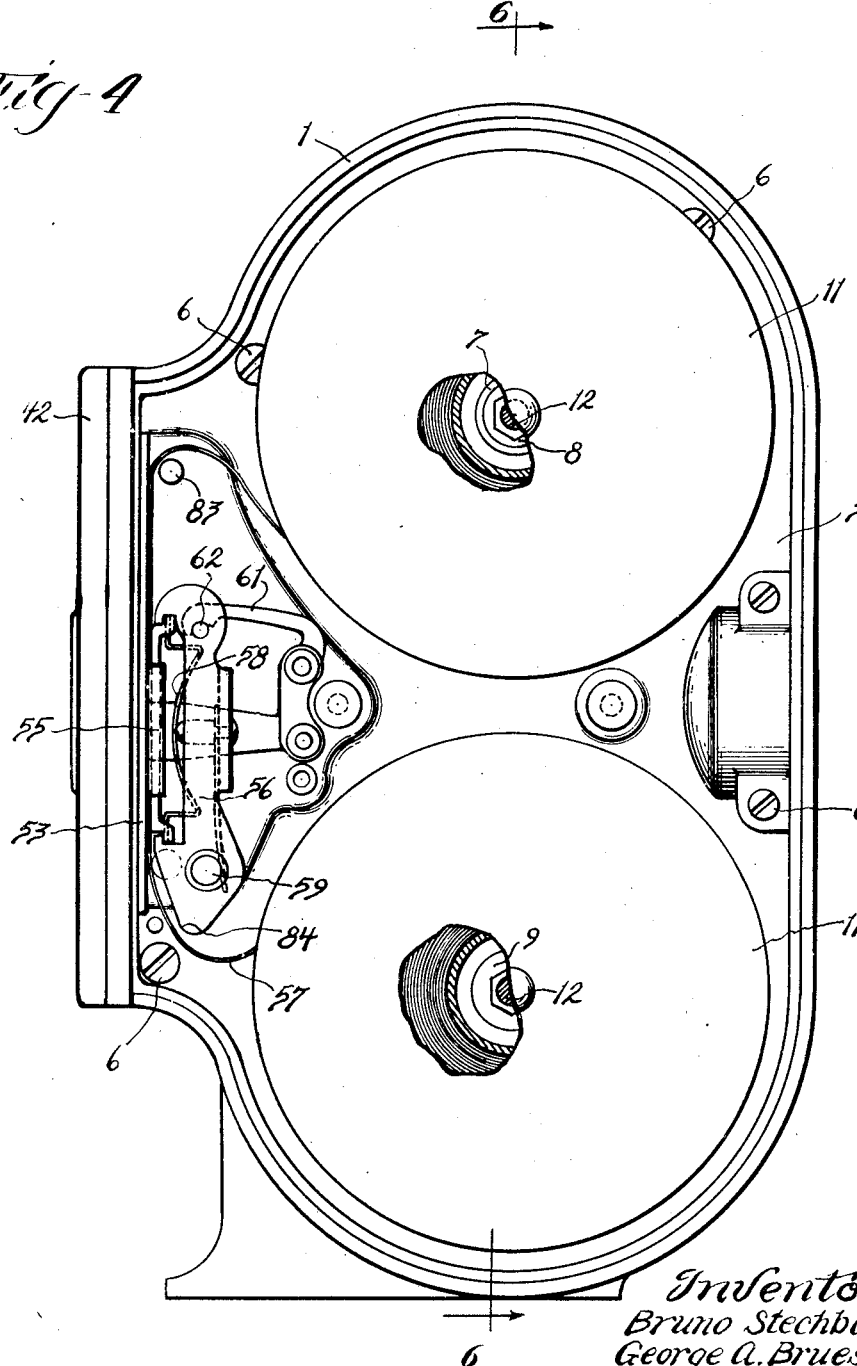
Inventors.
Bruno Stechbart
George A. Brueske

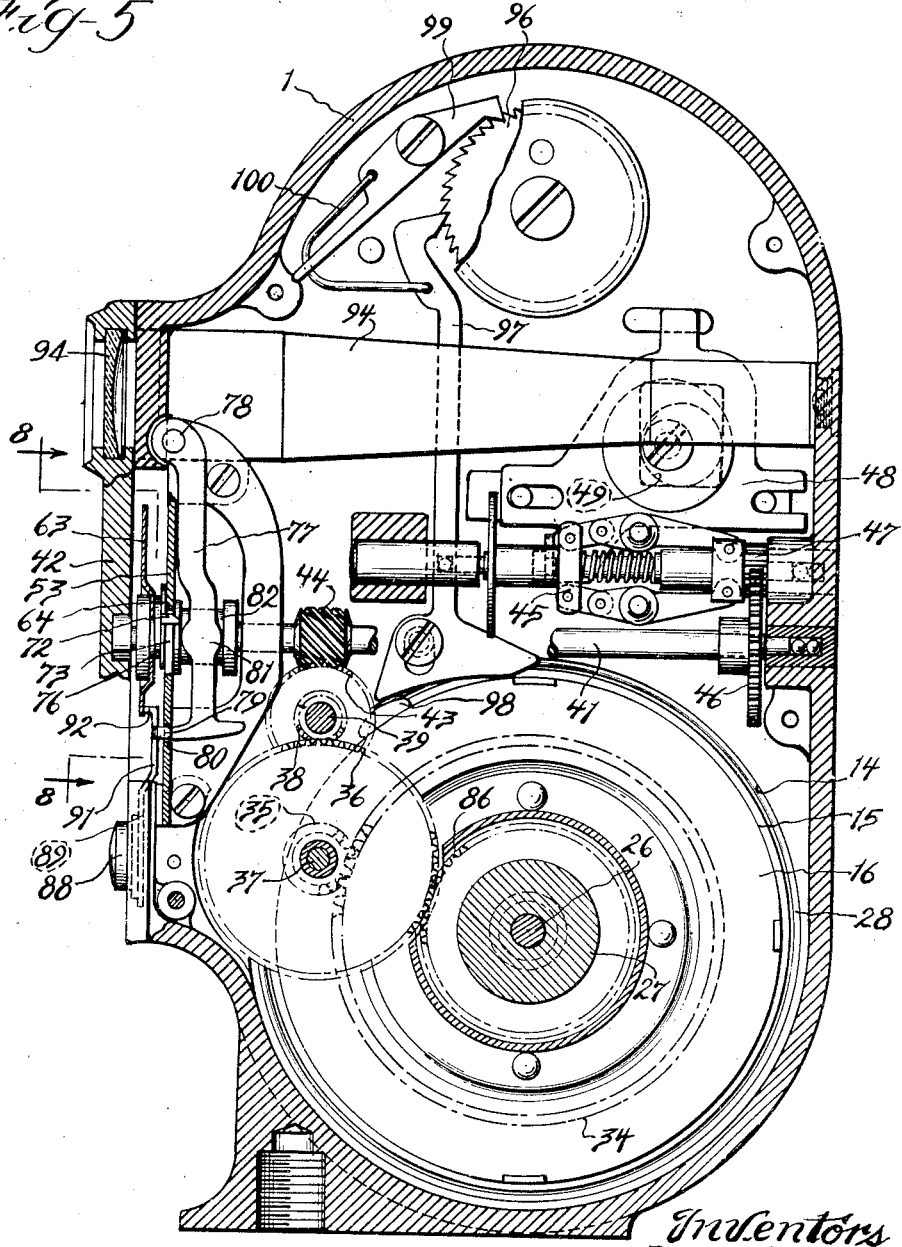

Dec. 27, 1938.　　　B. STECHBART ET AL　　　2,141,960
MOTION PICTURE CAMERA AND THE LIKE
Filed Feb. 2, 1934　　　5 Sheets-Sheet 4

Inventors
Bruno Stechbart
George A. Brueske
By
Atty.

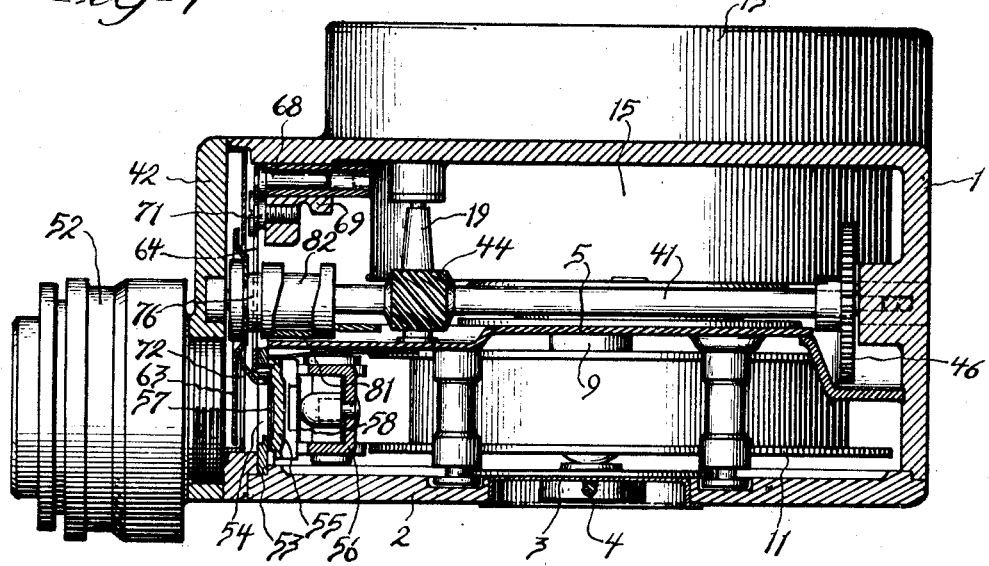
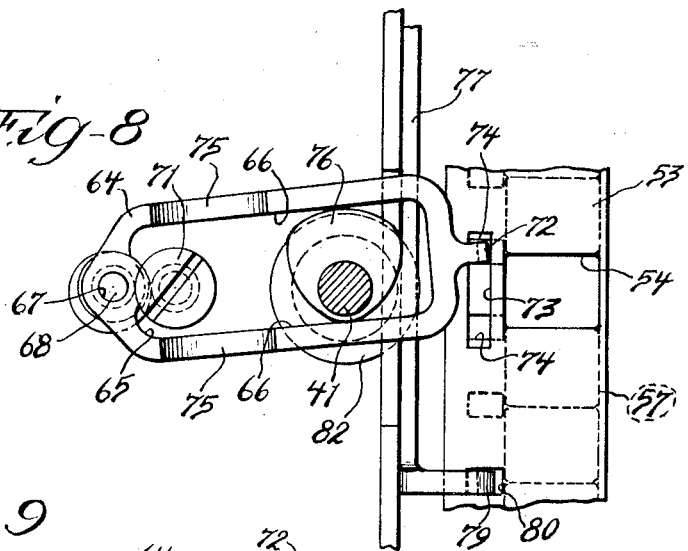
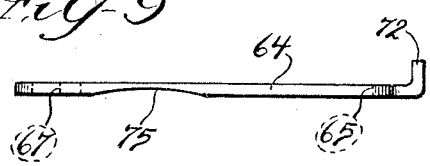

Patented Dec. 27, 1938

2,141,960

UNITED STATES PATENT OFFICE 2,141,960

MOTION PICTURE CAMERA AND THE LIKE

Bruno Stechbart and George A. Brueske, Chicago, Ill., assignors to The Bell & Howell Company, Chicago, Ill., a corporation of Illinois Application February 2, 1934, Serial No. 709,468

10 Claims. (Cl. 185—40)

Our invention relates particularly to motion picture cameras although not limited to this use alone.

The main features of our invention relate to the provision of a motion picture camera with a view toward lightness, compactness, ease and convenience in operation, simplicity and efficiency, convenience in assembly and accessibility of operating parts.

With these features in view our invention consists in certain features of novelty in the construction, combination and arrangement of parts by which the said features and certain other features are effected all as fully described with reference to the accompanying drawings and more particularly pointed out in the appended claims.

In the said drawings—

Figure 1 is a front elevation of a motion picture camera embodying our invention;

Figure 2 is a side elevation of the same;

Figure 3 is an opposite side elevation of the same;

Figure 4 is an enlarged side elevation similar to Figure 2 and having the cover or door of the casing removed and having parts broken away and shown in section;

Figure 5 is a sectional view in elevation similar to Figure 4;

Figure 7 is a sectional view substantially on the line 7—7 of Figure 6;

Figure 8 is a partial sectional view substantially on the line 8—8 of Figure 5; and Figure 9 is a top plan view of the intermittent film feed shuttle of the camera.

Like characters of reference indicate like parts in the several views.

Figure 6:
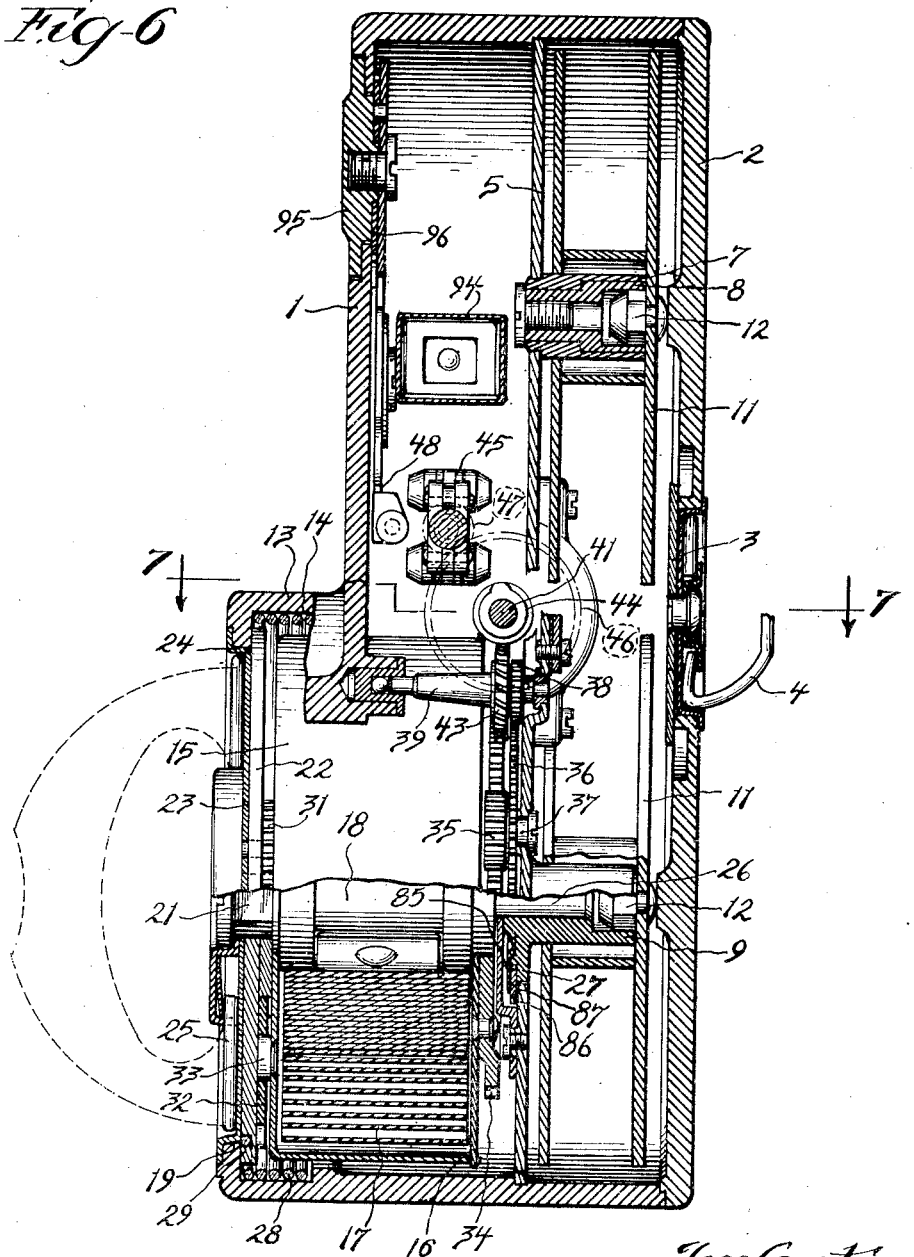
Figure 6 is a sectional view substantially on the line 6—6 of Figure 4.

Referring to the drawings, 1 designates a vertically elongated casing which is open at one side, and said open side is closed by a cover 2 releasably secured to the casing by a locking mechanism 3 which is operated to lock and release by an operating member 4 on the exterior of the cover. See Figures 2, 6 and 7.

A frame plate 5 is detachably secured in the casing intermediate and in parallelism with the sides thereof by means of headed screws 6. See Figures 4, 6 and 7.

The upper and lower ends of the casing 1 are semi-circular on vertically spaced transverse axes. Disposed on the upper of these transverse axes and secured in an aperture of the plate 5 is a concentrically bored stud 7 projecting in the direction of the open side of the casing, and a second concentrically bored stud 8 is frictionally mounted for rotation in the bore of the stud 7. See Figures 4 and 6. Disposed on the lower of the aforesaid transverse axes and mounted for rotation in an aperture through the frame plate 5 as hereinafter described, is a concentrically bored stud 9 which projects in the direction of the open side of the casing.

The portion of the enclosure of the casing between the frame plate 5 and the open side of the casing forms the film chamber of the casing, and film reels 11 are adapted to be removably mounted on the upper reel spindle comprising the studs 7 and 8 and the lower reel spindle comprising the stud 9, the reels being detachably mounted on the spindles in the manner described and claimed in copending application of Albert S. Howell for U. S. Letters Patent, Serial No. 685,984, filed August 21, 1933, now Patent 1,991,853, Feb. 19, 1935 for improvement in Reel and spindle mount therefor, and including hexagonal studs 12 fixed with the reels and engaging in corresponding bore portions of the studs 8 and 9 to form driving engagements therebetween.

The lower portion of the closed side of the casing 1 is extended outwardly, see Figures 1, 6 and 7, with a circular formation 13 disposed coaxial with the aforesaid lower transverse axis of the casing upon which the stud 9 is disposed and forming an interior circular surface 14 disposed on this axis.

A power spring device is arranged within the casing on the aforesaid lower transverse axis thereof and comprises a cup shaped member 15, a disk 16 secured with the member 15 and completing a casing therewith, a coiled power spring 17 arranged within this casing and having its outer end secured with the member 15, and a spindle 18 engaged for rotation in axial bores through the members 15 and 16 and thereby supporting the same. See Figures 5, 6 and 7.

The power spring device is disposed coaxial with the stud 9 and the extended portion 13 and is disposed partially within this portion and the main portion of the casing inwardly of the frame plate 5 and spaced therefrom.

The extended portion 13 of the casing 1 is provided with a relatively large concentric circular opening 19 in the transverse wall thereof, and the corresponding end of the spindle 18 is reduced, as designated at 21, and has secured thereon a bored disk 22, engaging against the inner surface of the transverse wall of the portion 13 about the opening 19, and a circular bored plate 23 provided with a peripheral offset portion 24 engaged for rotation in the opening 19 and the outer surface of the transverse wall of the portion 13, thus providing a bearing supporting the corresponding end of the spindle 18 for rotation. See Figure 6. A folding handle structure 25 is also secured on the spindle 18 on the outside of the plate 23 for the manual rotation of the spindle to wind the power spring device.

The other end of the spindle 18 is reduced, as designated at 26, and is engaged for rotation in the bore of the stud 9, the inner portion of the stud 9 being enlarged, as designated at 27, and engaged for rotation in an aperture through the frame plate 5. The spindle 18 of the power spring device is thus supported from the closed side of the casing 1 and from the frame plate 5.

A spring brake coil 28 engages the internal surface 14 of the casing extension 13 in surrounding relation with the power spring device, and has one end secured, as designated at 29, at the periphery of the disk 22 to prevent rotation of the spindle 18 in the direction to unwind the power spring 17 while permitting rotation of the spindle 18 in the opposite direction to wind the power spring, and stop gearing is disposed between the spring casing member 15 and the disk 22 to prevent excessive winding or unwinding of the power spring and comprises a gear 31 secured on the spindle 18 and a gear 32 meshing with the gear 31 and rotatably mounted on a stud 33 mounted on the casing member 15.

The spring brake coil 28 is normally tensioned against the internal surface 14 and is so coiled that when the spindle 18 is rotated in the direction to wind the power spring 17, the spring brake coil is contracted, by reason of one end thereof being fixed with the spindle 18, and rotates with this spindle to permit the winding of the power spring. Rotation of the spindle 18 in the opposite direction is prevented for the reason that in this direction the spring brake coil 28 is expanded against the surface 14 to lock the spindle 18 against rotation in this direction.

A bored gear 34 is engaged for rotation on the spindle 18 and is disposed between the casing member 16 and the frame plate 5 and is secured with the casing member 16 for the driving thereof by the power spring 17. See Figures 5 and 6. Two coaxial gears 35 and 36 which are secured together are mounted for rotation on a stud 37 mounted on the frame plate 5, the gears 35 and 36 being disposed on a transverse axis within the circumference of the power spring device and in planes between the power spring device and the frame plate 5.

The gear 35 is smaller than the gear 34 and meshes therewith to be driven therefrom, and the gear 36, which is larger than the gear 35, meshes with a relatively small gear 38 secured on a transverse spindle 39 which extends across between the closed side of the casing 1 and the frame plate 5 and is mounted for rotation thereon.

A forwardly and rearwardly extending shaft 41 is disposed in the casing 1 between the closed side thereof and the frame plate 5 and in parallelism therewith and is mounted for rotation in suitable bearings on the back wall of the casing and the front wall of the casing which is formed by a detachable front piece 42.

A spiral angle gear 43 is secured on the spindle 39 and meshes with a smaller spiral angle gear 44 formed on the shaft 41 whereby this shaft is driven from the power spring device through the multiplying gear train above described.

Arranged in the casing 1 between the closed side of the casing and the frame plate 5 is a centrifugal speed governor, generally designated at 45, which is driven from the shaft 41 by means of a gear 46 secured on the shaft 41 adjacent its rear end and meshing with a gear 47 on the governor, the governor being adjustable to vary the driven speed of the shaft 41 by means of a friction element carrying member 48 slidably mounted on the inside of the closed side of the casing and controlled by an eccentric 49 pivotally mounted on the casing and adjustable from the exterior of the casing by means of a dial 51. See Figures 3, 5 and 6.

A photographic lens 52 is mounted in an aperture through the front piece 42 intermediate the top and bottom of the casing 1 and is disposed on an axis alined with the film chamber, and disposed in the film chamber at the forward intermediate portion thereof is an exposure apertured intermittent film feed guide comprising a front face guide plate 53 provided with an exposure aperture 54 alined with the lens and a rear guide device consisting of a rear face guide member 55 mounted on a bracket 56 and yieldably urged forwardly to engage a film 57 between it and the plate 53 by a spring 58, the bracket 56 being pivoted on a downwardly disposed transverse stud 59 mounted on the frame plate 5 and held in forward film retaining position by a notched spring arm 61 engaging a stud 62 on the upper end of the bracket which is releasable to permit rearward tilting of the bracket 56 carrying the rear guide member 55 for the lacing of the film. See Figures 1, 4 and 7.

A segmental light shutter 63 is secured on the forward portion of the shaft 41 in a plane between the front piece 42 and the front guide plate 53 and serves to intermittently cut off the exposure light at the exposure aperture for the exposure of successive sections of the film in the guide as it is fed therethrough by an intermittent film feeding mechanism now to be described. See Figures 1, 5 and 7.

An elongated feed shuttle 64 of flat form is provided with a correspondingly elongated aperture 65 providing parallel opposing surfaces 66 extending longitudinally thereof. See Figures 7, 8 and 9. The shuttle is provided with a bearing aperture 67 at one end which is pivotally engaged on an eccentric stud 68 disposed on a forwardly and rearwardly extending axis and mounted in a bored boss 69 at the inside of the closed side of the casing 1 intermediate the top and bottom thereof, a headed and shouldered screw 71 screwthreaded into the boss 69 serving to retain the aperture 67 engaged on the stud 68.

The shuttle 64 is so mounted for pivotal movement in its plane and is disposed in a vertical plane between the shutter 63 and the front guide plate 53 and is arranged transversely. The other end of the shuttle is provided with a rearwardly projecting ratchet tooth 72 projecting through a vertical slot 73 in the guide plate 53 for engagement with marginal perforations 74 of the film 57 in the guide for intermittently feeding the film with reciprocation of the shuttle, the ratchet tooth 72 effecting downward feeding movement of the film with downward movement of the shuttle and the tooth disengaging from the engaged perforation and sliding over the film on the upward movement of the shuttle for engagement with another perforation, the shuttle flexing normal to its plane for engaging and disengaging the film perforations.

In order that the shuttle 64 flexes normal to its plane without undue strain, it is reduced normal to the plane thereof adjacent its pivotal axis, as designated at 75 in Figures 8 and 9.

The shaft 41 extends through the aperture 65 of the shuttle 64 and has a radial cam 76 formed thereon which oppositely engages the opposing surfaces 66 of the aperture 65 to reciprocate the shuttle with rotation of the shaft, this cam being timed with the shuter 63 so that the movement periods of the film take place when the exposure aperture 54 is covered by the shutter.

A pilot member 77 is pivoted on a transverse axis, as designated at 78, and extends downwardly therefrom and is provided at its lower end with a rearwardly projecting pilot tooth 79 which in the rearward position of the member 77 projects through an aperture 80 through the front guide plate and engages an aperture 74 of the film for registering the film during the rest or exposure periods in the feeding movement thereof. See Figures 5 and 8.

The member 77 is provided at its intermediate portion with a partially circular portion 81 which is engaged in the slot of a drum cam 82 formed on the shaft 41, so that the member 77 is reciprocated in timed relation with the shuttle 64 to alternate therewith in the control of the film by alternate engagement with perforations thereof, so that the film is at all times under positive control in the exposure guide.

The film in the camera is fed from the upper reel 11 over a stud 83 mounted on the frame plate 5 above the film guide and downwardly to the upper end of the film guide and is fed from the lower end of the film guide to the lower reel 11 upon which it is wound, the film being guided to the lower reel by a guide formation 84 on the lower end of the bracket 56. See Figure 4.

The film is drawn from the upper reel 11 by the intermittent feed mechanism and the spindle 9 is driven to wind the film on the lower reel 11 to take up the film as fed through the guide, in the following manner. See Figures 5 and 6.

As aforesaid the inner portion of the spindle 9 is enlarged, as designated at 27, and engaged for rotation on a shoulder formation 85 on the inner face of this enlargement, is a ring gear 86 which is maintained in frictional engagement with this enlargement to form a frictional driving engagement with the spindle 9 by a spring washer 87 secured at the inner end of the spindle. See Figures 5 and 6. The gear 86 meshes with the aforementioned gear 36 for the driving of the spindle 9 to take up the film during the operation of the mechanism, the frictional driving engagement between the ring gear 86 and the spindle 9 accommodating for the varying diameter of the film roll on the lower reel 11.

Operation of the mechanism is controlled by a push button 88 on the front of the camera which is operatively connected with a spring plate 89 provided with an upwardly projecting arm 91 which has a forwardly projecting stop portion 92 at its upper end yieldably urged forwardly into the plane of the shutter 63 to engage a radial stop formation 93 thereon to prevent actuation of the mechanism, inward movement of the push button actuating the portion 92 of the plane of the shutter to permit operation of the mechanism. See Figures 1 and 5.

Extending forwardly and rearwardly through the casing 1 between the closed side thereof and the frame plate 5 is a viewing device 94 arranged above the power spring device and the governor 45, the axis of the viewing device being thus desirably close to that of the photographic lens. See Figures 1, 5 and 6.

A footage recording device is provided and consists of a dial 95 rotatably mounted in a bore through the closed side of the casing 1 and having a ratchet wheel 96 disposed on the inside of the casing and secured therewith, a slidably mounted ratchet member 97 on the inside of the closed side of the casing, a cam lug 98 on the power spring casing member 15 for operating the member 97 upwardly to actuate the ratchet wheel 96 and dial 95, a pivoted check ratchet member 99 and a spring 100 operative between the members 97 and 99 to maintain them in engagement with the ratchet wheel and to move the member 97 downwardly. See Figures 5 and 6.

Having thus described our invention, we do not wish to be limited to the precise details described as changes may be readily made without departing from the spirit of our invention, but having thus described our invention, we claim as new and desire to secure by Letters Patent the following:

1. A motion picture camera including an enclosing casing provided with an outwardly projecting portion providing a circular internal surface, a power spring device arranged in said casing in concentric relation with said internal surface and projecting into said projecting portion and including an element rotatable for winding the same, and a spring brake coil engaging said internal surface in surrounding relation with said spring device and operatively connected with said rotatable element to prevent rotation thereof in the direction opposite the winding direction of the same.

2. A motion picture camera including an enclosing casing provided with a relatively large circular opening and a circular internal surface disposed inwardly of said opening in concentric relation therewith, a power spring device arranged in said casing in concentric relation with said internal surface and including an element rotatable for winding the same, means whereby said element is supported for rotation in said opening, and a spring brake coil engaging said internal surface and operatively connected with said rotatable element to prevent rotation thereof in the direction opposite the winding direction of the same.

3. A motion picture camera including an enclosing casing provided with an outwardly projecting portion provided with a relatively large circular opening in the transverse wall thereof and providing a circular internal surface disposed inwardly of said opening in concentric relation therewith, a power spring device arranged in said casing in concentric relation with said internal surface and projecting into said projecting portion and including a spindle rotatable for winding the same, a disklike structure secured with said spindle and rotatably engaged in said opening for supporting said spindle, and a spring brake coil engaging said internal surface and operatively connected with said disklike structure to prevent rotation of said spindle in the direction opposite the winding direction of the same.

4. A motion picture camera including an enclosing casing provided with a relatively large circular opening, a power spring device arranged in said casing in concentric relation with said opening and provided with a disklike structure rotatably engaged in said opening and closing the same and forming a support for said power spring device, and a folding handle structure on the exterior of said disklike structure and secured with said power spring device for winding the same.

5. A motion picture camera including an enclosing casing provided with a relatively large circular opening, a power spring device arranged in said casing in concentric relation with said opening and provided with a rotatable winding spindle and a disklike structure secured with said spindle and rotatably engaged in said opening and closing the same and forming a support for said power spring device, and a folding handle structure on the exterior of said disklike structure and secured with said spindle for winding said power spring device.

6. A motion picture camera including an enclosing casing provided with a relatively large circular opening, a power spring device arranged in said casing in concentric relation with said opening and provided with a disklike structure rotatably engaged in said opening and closing the same and forming a support for said power spring device, said disklike structure comprising disk members oppositely engaging said casing axially of said power spring device, and a folding handle structure on the exterior of said disklike structure and secured with said power spring device for winding the same.

7. A motion picture camera including an enclosing casing open at one side, a frame plate secured in said casing intermediate the sides thereof and in parallelism therewith, a power spring device arranged in said casing on a transverse axis between the other side of said casing and said frame plate and including a spindle, means whereby said spindle is supported from said other side of said casing, and a bored film reel spindle rotatably mounted on said frame plate in coaxial relation with said first mentioned spindle and having its bore rotatably engaged thereon.

8. A motion picture camera including an enclosing casing open at one side, a frame plate secured in said casing intermediate the side thereof and in parallelism therewith, a power spring device arranged in said casing on a transverse axis between the other side of said casing and said frame plate and including a coiled power spring and a revoluble spindle secured with the inner end of the power spring, means whereby said spindle is supported for rotation from said other side of said casing, and a bored film reel spindle rotatably mounted on said frame plate in coaxial relation with said first mentioned spindle and having its bore rotatably engaged thereon.

9. A motion picture camera including an enclosing casing open at one side, a frame plate secured in said casing intermediate the sides thereof and in parallelism therewith, a power spring device arranged in said casing on a transverse axis between the other side of said casing and said frame plate and including a coiled power spring and a spindle, means whereby said spindle is supported from said other side of said casing, a bored film reel spindle rotatably mounted on said frame plate in coaxial relation with said first mentioned spindle, and having its bore rotatably engaged thereon, film feeding mechanism, a multiplying gear train for driving said feeding mechanism from said spring device and including at least one gear arranged on a transverse axis and in a plane between said spring device and said frame plate, and means for driving said reel spindle from said gear train.

10. A motion picture camera including an enclosing casing open at one side, a frame plate secured in said casing intermediate the sides thereof and in parallelism therewith, a power spring device arranged in said casing on a transverse axis between the other side of said casing and said frame plate and including a coiled power spring and a revoluble spindle secured with the inner end of the power spring, means whereby said spindle is supported for rotation from said other side of said casing, a bored film reel spindle rotatably mounted in a bore through said frame plate in coaxial relation with said first mentioned spindle and having its bore rotatably engaged thereon, film feeding mechanism, a multiplying gear train for driving said feeding mechanism from said spring device and including at least one gear arranged on a transverse axis and in a plane between said spring device and said frame plate, and a second gear frictionally connected with said reel spindle and meshing with said first mentioned gear for driving said reel spindle.

BRUNO STECHBART.
GEORGE A. BRUESKE.